Figure 1:
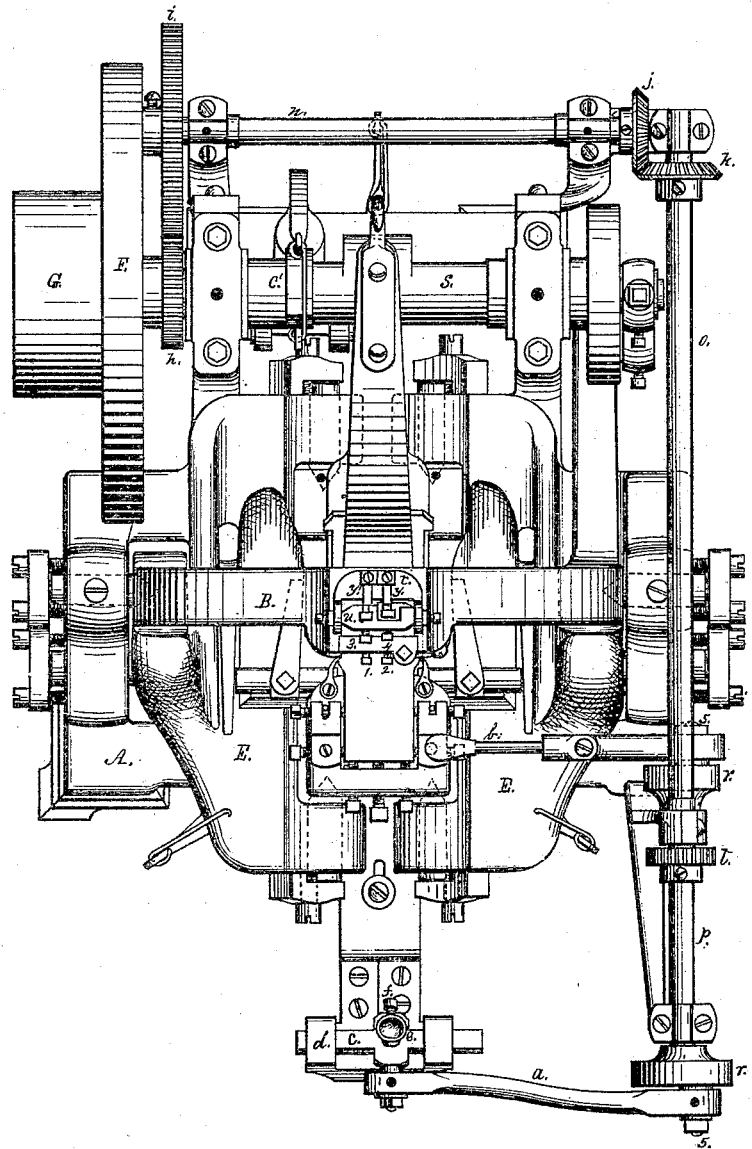

7 Sheets—Sheet 1.

W. HADDOCK.
CUT-NAIL MACHINE.

No. 172,427. Patented Jan. 18, 1876.

Witnesses
James J. Johnston
A. C. Johnstone

Inventor
Worcester Haddock

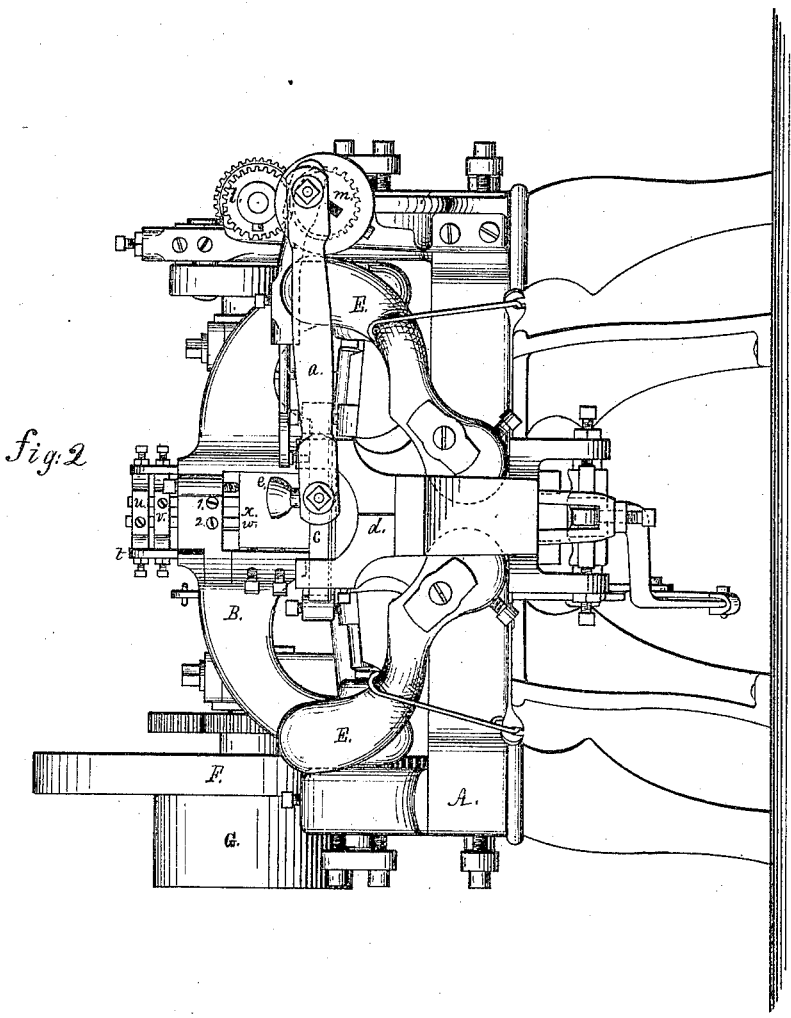

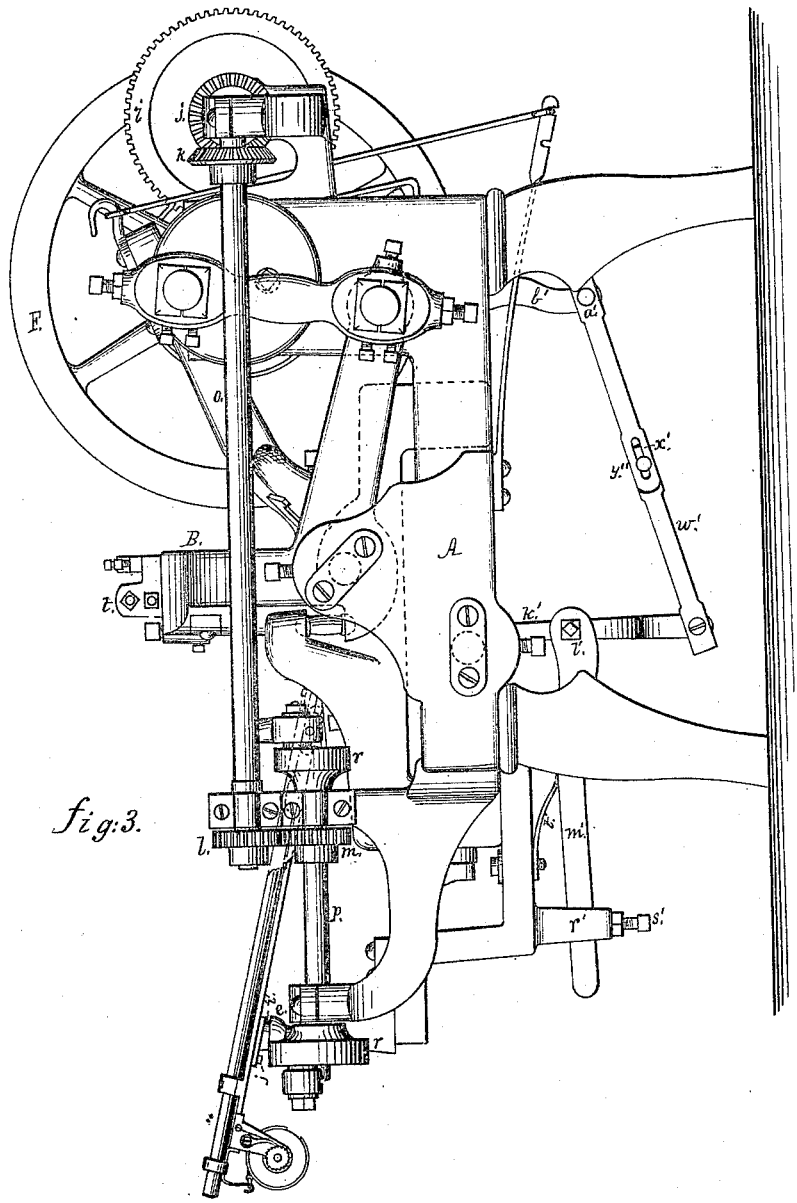

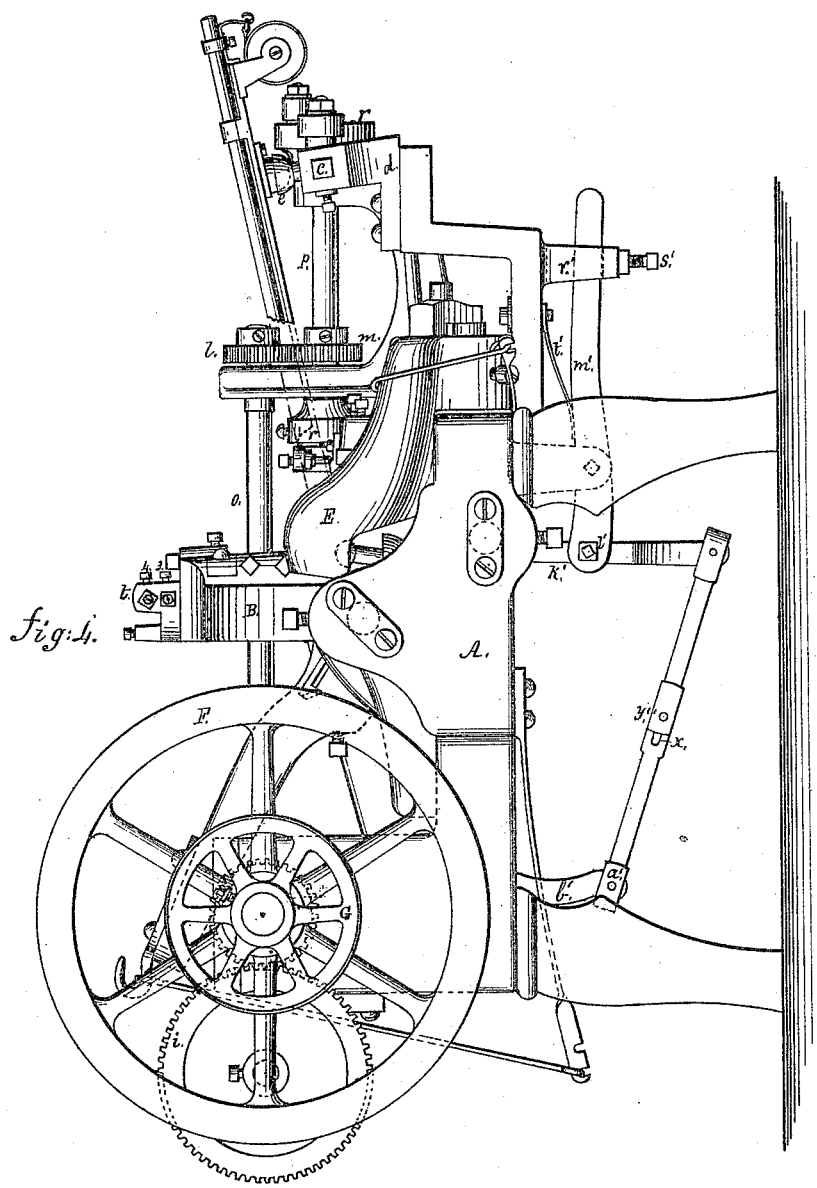

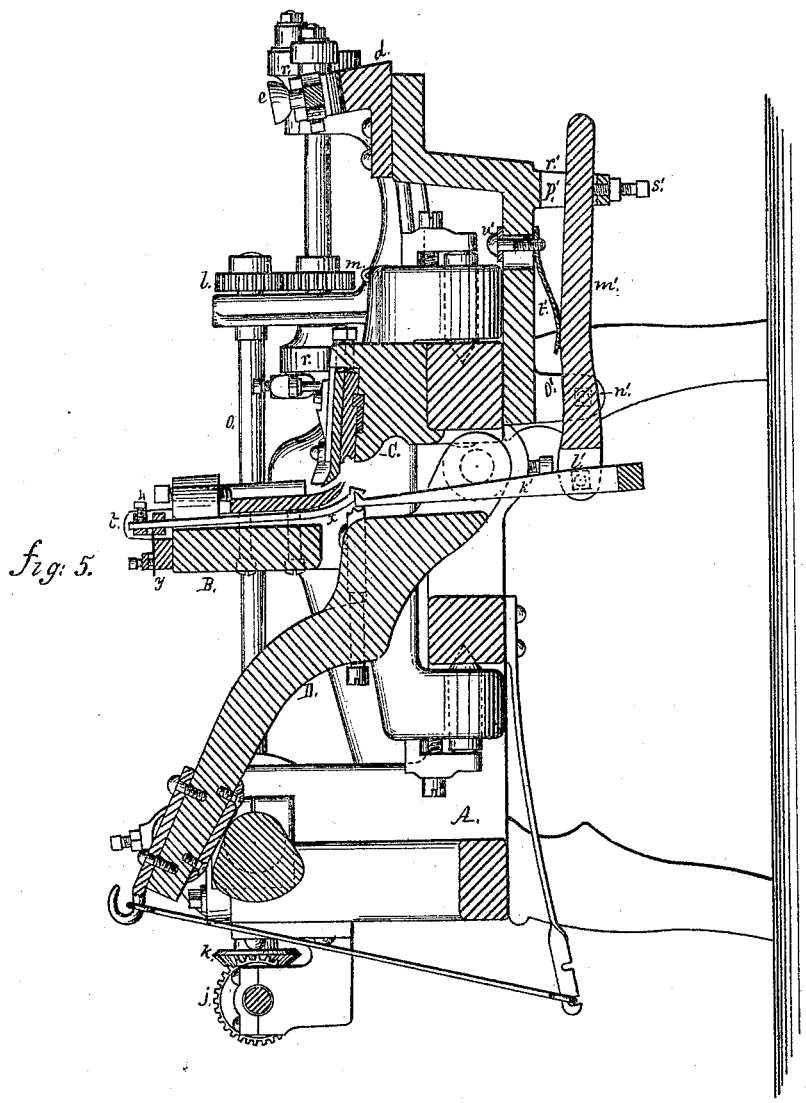

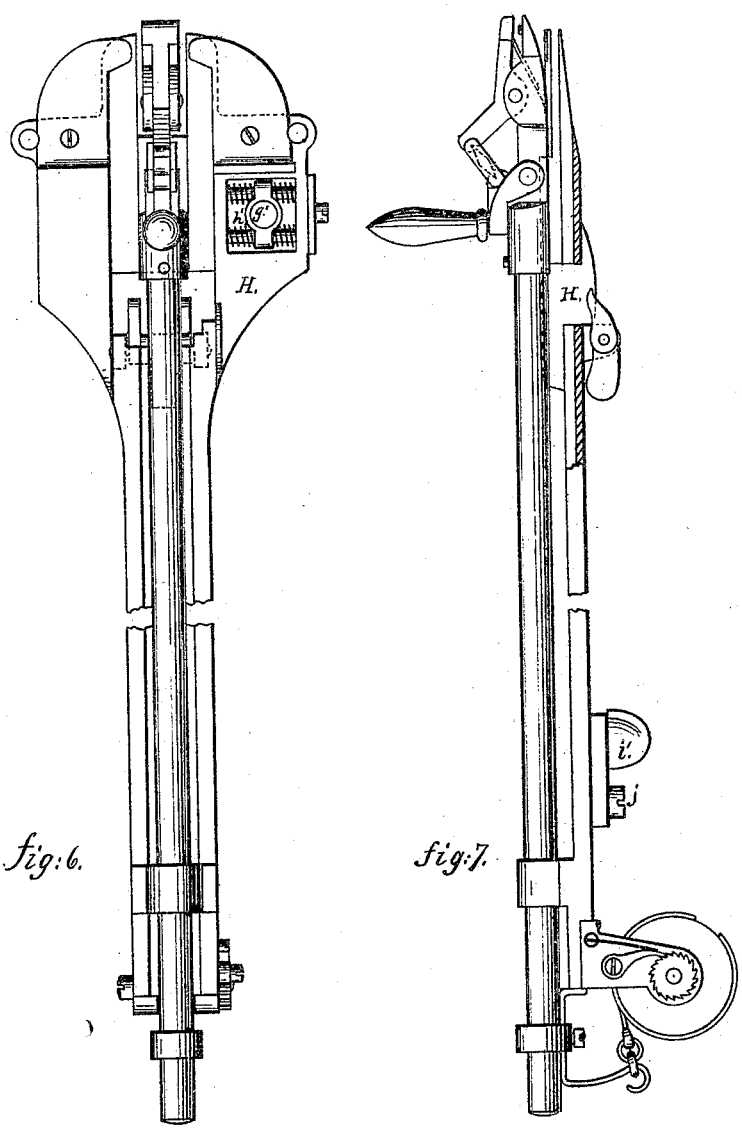

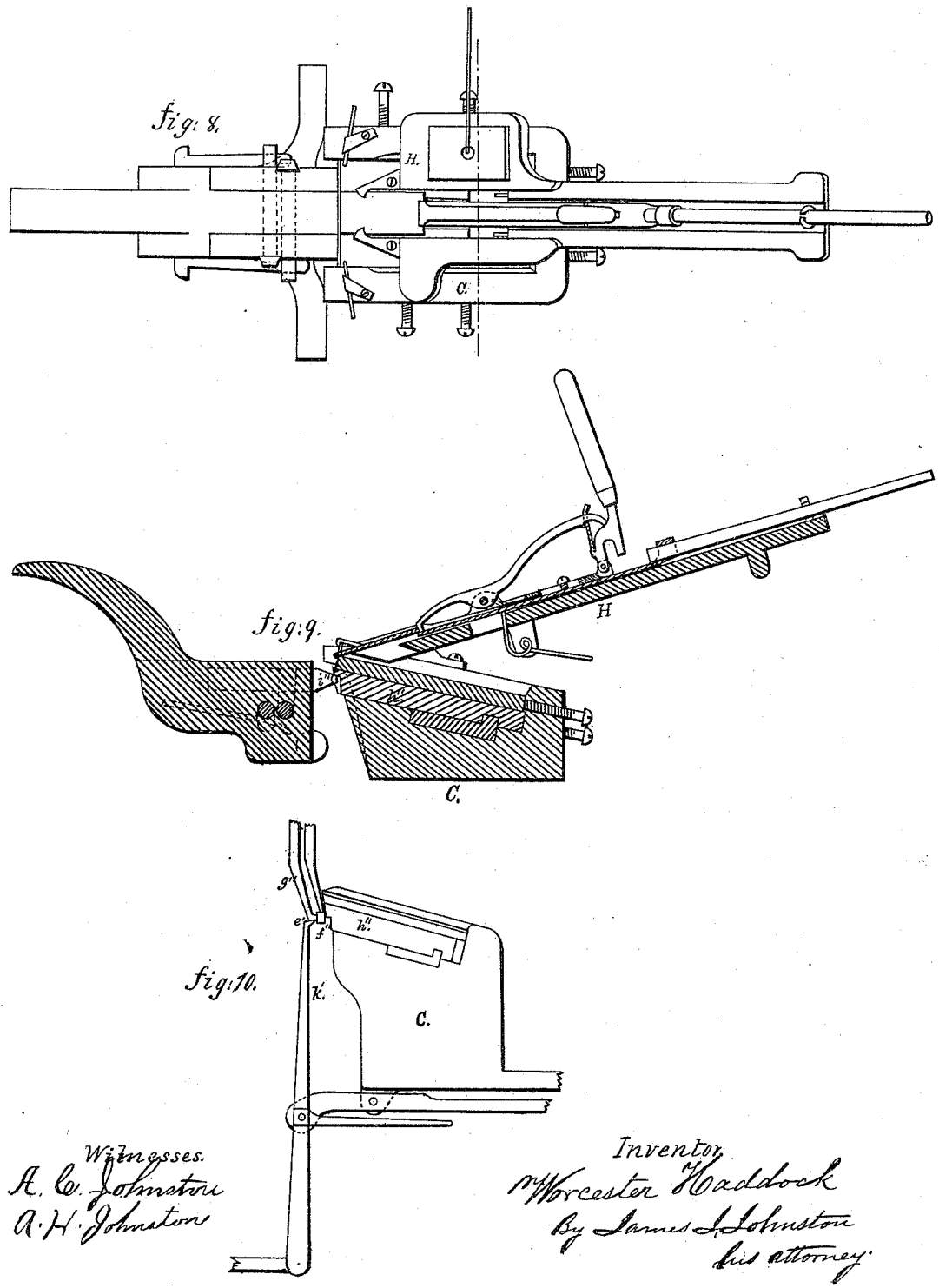

UNITED STATES PATENT OFFICE.

WORCESTER HADDOCK, OF PITTSBURG, PENNSYLVANIA, ASSIGNOR, BY MESNE ASSIGNMENTS, TO AURORA IRON AND NAIL COMPANY, OF AURORA, INDIANA.

IMPROVEMENT IN CUT-NAIL MACHINES.

Specification forming part of Letters Patent No. 172,427, dated January 18, 1876; application filed September 13, 1875.

*To all whom it may concern:*

Be it known that I, WORCESTER HADDOCK, of Pittsburg, in the county of Allegheny and State of Pennsylvania, have invented a new and useful Improvement in Cut-Nail Machines; and I do hereby declare that the following is a full and exact description thereof, reference being had to the accompanying drawings, and to the letters of reference marked thereon.

My invention relates to an improvement in cut-nail machines; and consists, first, in providing the cutting-lever with two bridles for the two gages, whereby the gages can be adjusted, and act independent of each other; second, in so pivoting and attaching the vibrating plate, which carries the plate-nipper, that the desired angle can be given to the nails while the inner and outer ends of the vibrating plate are traveling in the same direction; third, in the combination of levers, spring, and adjusting-screws, with the nail-nipper, whereby the nail-nipper can be readily adjusted with relation to its catching and turning the nail prior to its being subjected to the action of the heading-dies.

To enable others skilled in the art to make and use my invention, I will proceed to describe its construction and operation.

In the accompanying drawings, which form part of my specification, Figure 1 is a top view or plan of my improvement in cut-nail machines. Fig. 2 is an end elevation of the same. Figs. 3 and 4 are side elevations of the same. Fig. 5 is a vertical section of the same, representing the vibrating plate and plate-nipper. Fig. 6 is a top view of the vibrating plate and plate-nipper. Fig. 7 is a side view of the vibrating plate and plate-nipper. Fig. 8 is a detached view of the plate-nipper, vibrating plate, die-box, and griping-lever. Fig. 9 is a vertical section of the parts represented in Fig. 8. Fig. 10 represents the nail-nipper in its relation to the nail prior to turning it one-fourth around.

The cut-nail machine represented in the accompanying drawings is constructed in all respects like the ordinary nail-cutting machine having two heading-levers, except in the following particulars: first, in the die-box; second, in the manner of securing the griping-dies; third, in the feeding device, all of which are fully described in Letters Patent granted to me November 25, 1873, numbered 144,845, which were subsequently reissued to the Haddock Nail-Machine and Nail Company. There are other exceptions in the construction of the machine, which are as follows: first, in providing the cutting-lever with two independent gages, suspended in separate bridles; second, in the crank-pin used in connection with the operating-gear for the self-feeding device; third, in the adjustability of the nail-nipper through the medium of levers, a spring, and adjusting-screws. These three last-recited exceptions are what constitute my present invention, the first and third being fully described in this specification, the second being described in the specification of another application for Letters Patent of the United States, which bear even date with this application, and marked Case B.

In the accompanying drawings, A represents the frame of the nail-cutting machine. B represents the cutting-lever; C, the die-box; D, the griping-lever; E, the heading-levers; F, the fly-wheel, and G the driving-pulley. The driving-gear for operating the feeding device consists of the wheels $h\ i\ j\ k\ l\ m$, shafts $n\ o\ p$, and crank-disks $r$. The wheel $h$ is placed on the shaft $s$, and wheels $i\ j$ on the shaft $n$, and wheels $k\ l$ on the shaft $o$, and the wheel $m$ on the shaft $p$, on the ends of which are secured the crank-disks $r$, all of which is clearly shown in Figs. 1 and 3.

The wheel $h$ being on the cam-shaft $s$, which imparts motion to the several parts of the nail-cutting mechanism, it will give the wheels $i\ j\ k\ l\ m$, and shafts $n\ o\ p$, and the crank-disks $r$ the speed required to make said wheels, shafts, and disks harmonize with the speed given to the cutting mechanism of the nail-cutting machine. Therefore the self-feeding device for feeding the nail-plate to the cutters will always in its movements correspond to the speed of the other parts of the machine. The cutting-lever B is provided with a "saddle," $t$, in which are pivoted separate bridles $u$ $v$ for two separate gages, $w$ $x$, which are adjusted separately by set-screws 1 and 2. The advantage of this arrangement will be apparent to the nailer, for by it he can adjust each gage so as to regulate its action to the variations which occur in grinding the cutters.

The gages are held to their work by separate springs $y$ and $y'$, and held in bridles $u$ $v$ by set-screws 3 and 4. (Shown in Figs. 1 and 2.) The crank-disks $r$ on shaft $p$ are provided with adjustable wrist-pins 5, which are adjusted by means of screws arranged in the disks, and furnished with a right-and-left-hand threads, a full description of which is given in the specification hereinbefore referred to and marked Case B. To the wrist-pins 5 are pivoted two connecting-rods, $a$ $b$. The inner end of the connecting-rod $a$ is pivoted to a slide, $c$, which moves in a support, $d$, secured to the front end of the frame A. The inner end of the connecting-rod $b$ is provided with a hook, which hooks into the opening $g'$ of the yielding piece $h'$ of the vibrating plate H, (see Fig. 6,) by which arrangement the inner end of the vibrator can be readily disconnected from the driving-gear of the feed-device of the machine. In the slide $c$ is arranged an adjustable socket, $e$, which is held in the slide $c$ by means of a set-screw, $f$. The socket $e$ is used for the adjustable pivot-point $i$ on the under side of the vibrator H, near its outer end. The pivot $i'$ is held in the desired position, with relation to the vibrator H, through the medium of a set-screw, $j'$.

The pivot $i'$ is placed in the adjustable socket $e$ of the slide $c$, to which is given a reciprocating motion through the medium of the connecting-rod $a$, said slide moving at about right angle to the longitudinal plane of the vibrator H.

By this arrangement of the adjustable socket $e$, and adjustable pivot $i'$, and hook on the inner end of the connecting-rod $b$, the vibrator H can be readily disconnected from its driving-gear, and be removed from the machine; and the desired elevation can be given to the outer end of the vibrator, for the purpose of properly feeding the nail-plate to the cutter of the cutting-lever B, so as to secure the desired edge to the cut nail.

The nail nipper $k'$ is pivoted at $l'$ to the lever $m'$, which is pivoted at $n'$ between two lugs, $o'$. The outer end of said lever passes through an opening, $p'$, in a pendant, $r'$, in the lower end of which is a set-screw, $s'$. On the upper side of the lever $m'$ is a spring, $t'$, which can be, by means of the set-screw $u'$, adjusted so as to bring the desired pressure on the lever $m'$. To the lower end of the nail-nipper $k'$ is pivoted a lever, $w'$, which is made in two parts, having slots $x'$, and coupled together by means of a set-screw, $y''$, so that said lever can be lengthened at the pleasure of the operator. The lever $w'$ is connected at $a'$ to a pivoted vertical lever, $b'$, to which is imparted a vibrating motion by means of a cam, $c'$, on the cam-shaft $s$. (See Fig. 1.)

By this arrangement of the nail-nipper $k'$, levers $m'$ $w'$ $b'$, spring $t'$, and set-screws $y''$, $s'$, and $u'$, the nailer can adjust the nail-nipper so as to take the desired hold on the edge of the nail, as indicated at $e'$ in Fig. 10, (in which $f''$ is the nail, $g''$ the gages, and $h''$ the bed-piece,) for the purpose of turning the nail prior to being griped by the dies $i''$, and prior to heading it.

The office of the nail-nipper and its mode of action being well understood by the skilled nailer, he will, therefore, readily understand the advantages of having the several levers, set-screws, and springs connected therewith adjustable.

Having thus described my improvements, what I claim as of my invention is—

1. In a nail-cutting machine, a cutting-lever, furnished with two bridles for the gages, whereby the latter are pivoted separately, substantially as herein described, and for the purpose set forth.

2. The combination of the saddle $t$, bridles $u$ $v$, gages $w$ $x$, and cutting-lever, substantially as herein described, and for the purpose set forth.

3. The adjustable pivot $i'$ and adjustable socket $e$, in combination with the vibrator H, substantially as herein described, and for the purpose set forth.

4. The slide $c$, furnished with an adjustable socket, $e$, for the pivot $i'$ of the vibrator H, substantially as herein described, and for the purpose set forth.

5. The combination of the levers $m'$ $w'$, spring $t'$, and adjusting-screws $s'$ $y''$ with the nail-nipper $k'$, substantially as herein described, and for the purpose set forth.

WORCESTER HADDOCK.

Witnesses:
  JAMES J. JOHNSTON,
  A. C. JOHNSTON.